US005150135A

United States Patent [19]

Casey et al.

[11] Patent Number: 5,150,135

[45] Date of Patent: Sep. 22, 1992

[54] CURRENT SENSING DEVELOPMENT CONTROL SYSTEM FOR AN IONOGRAPHIC PRINTING MACHINE

[75] Inventors: Brendan C. Casey, Webster; William L. Gary, Lyons, both of N.Y.

[73] Assignee: Xerox Corporation, Stamford, Conn.

[21] Appl. No.: 569,806

[22] Filed: Aug. 20, 1990

[51] Int. Cl.[5] .............................................. G01D 15/06

[52] U.S. Cl. ..................................... 346/159; 346/1.1; 355/208; 355/246; 118/653; 118/689; 118/690

[58] Field of Search ................ 355/246, 208; 346/159, 346/1.1; 118/653, 689, 690

[56] References Cited

U.S. PATENT DOCUMENTS

| | | | |
|---|---|---|---|
| 3,719,165 | 3/1973 | Trachienberg et al. | 118/690 |
| 3,779,204 | 12/1973 | Altmann | 118/668 |
| 3,877,413 | 4/1975 | Rowell et al. | 118/689 X |
| 3,910,459 | 10/1975 | Bock et al. | 118/689 X |
| 4,434,221 | 2/1984 | Oka | 430/122 |
| 4,456,370 | 6/1984 | Hayes, Jr. | 355/208 |
| 4,492,179 | 1/1985 | Folkins et al. | 118/689 |
| 4,515,292 | 5/1985 | Koos, Jr. | 222/52 |
| 4,538,897 | 9/1985 | Osaka et al. | 355/3 DD |
| 4,619,522 | 10/1986 | Imai | 355/14 D |
| 4,737,805 | 4/1988 | Weisfield et al. | 346/159 |
| 4,951,071 | 8/1990 | Eolkins | 346/159 |
| 4,974,024 | 11/1990 | Bares et al. | 355/246 |
| 4,980,723 | 12/1990 | Buddendeck et al. | 355/218 |
| 4,999,673 | 3/1991 | Bares | 355/208 |
| 5,003,327 | 3/1991 | Theodoulou et al. | 346/154 |
| 5,019,859 | 5/1991 | Nash | 355/77 |

*Primary Examiner*—Benjamin R. Fuller
*Assistant Examiner*—Randy W. Gibson

[57] ABSTRACT

An apparatus which develops an electrostatic image with marking particles. The apparatus includes a developer roller for transporting the marking particles to a position adjacent an electrostatic image for the purpose of developing the image. During deposition of the marking particles on the image, the apparatus senses the charge thereon and in response to the sensed charge, additional marking particles are dispensed into the developer roll housing for use by the developer roller. The apparatus further includes an impoved method for periodically determining the actual concentration of the marking particles within the developer housing in order to modify the rate at which the marking particles are replenished, thereby maintaining an equilibrium concentration of marking particles within the developer housing.

14 Claims, 6 Drawing Sheets

CURRENT SENSING DEVELOPMENT CONTROL SYSTEM FOR AN IONOGRAPHIC PRINTING MACHINE

BACKGROUND OF THE INVENTION

1. Field of the Invention

This invention relates generally to an ionographic printing machine, and more particularly to a scheme for controlling the toner concentration within the developer mixture by sensing the charge of the particles which develop a latent image patch having predefined characteristics.

2. Description of the Prior Art

In general, the process of ionographic printing includes charging of an electrostatic member to a substantially uniform potential to sensitize the surface thereof. The charged surface of the electrostatic member is subsequently exposed to a charge pattern representative of the image to be produced, thereby forming an electrostatic latent image. The latent image is then developed by bringing developer material into contact therewith. Generally, the developer material is composed of toner particles adhering triboelectrically to carrier granules. The toner particles are attracted from the carrier granules to the latent image forming a toner image on the electrostatic member, which is subsequently transferred and fused to a print sheet.

More specifically, as toner particles are depleted from the developer material, additional toner particles must be added thereto. Many types of toner concentration regulating systems are known in the art. For example, U.S. Pat. No. 4,619,522 to Imai teaches the use of a reference pattern, with a predetermined reflectance, that is developed. Subsequently, the density of the developed pattern is detected and used to regulate the replenishment of toner to the developer.

Furthermore, U.S. Pat. No. 4,434,221 to Oka discloses a method of utilizing a reference latent image to measure the current flow between the developing sleeve and the photoreceptor drum during development of the reference image. Subsequently, the amount of toner needed for replenishment is controlled, based on the current value measured. Oka further characterizes this method as inferior, because, the variation in current value due to toner concentration is exceeded by the variation due to the amount of toner adhering to the reference image.

In addition, U.S. Pat. No. 4,492,179 to Folkins et al., incorporated herein by reference, teaches the sensing of the charge of the toner particles being transferred to the latent image, and controls the addition of toner to the developer as a function of that measurement. Folkins et al. also discloses the limitations of the marking particle dispense control system, relating to toner dispensing assumptions, wherein the rate of dispense must remain constant over the life of the system. More specifically, any variation in the toner mass dispensed for a given electrical input will manifest itself proportionally as a shift in the relationship between the toner dispense rate and the bias current required for the developed toner charge. Unfortunately, these limitations can lead to the implementation of a development system that is prohibitively expensive to be utilized in low volume personalized printing systems, such as an ionographic printing machine.

It is therefore an object of the present invention to provide an apparatus to improve the method of regulating the concentration of toner particles in the developer mixture. It is another object of the present invention to provide an improved apparatus for regulating the dispensing of toner into a developer mixture in response to the current generated by the developer toner and in proportion to the current generated by the periodic development of a latent image patch having a set of predefined and controlled characteristics. It is yet another object of the present invention to provide a means for periodically generating a latent image patch, whereby said patch consistently meets a set of predefined characteristics. It is a final object of the present invention to increase the allowable latitude of the development station components so as to reduce the overall cost of the components without impact to the image development capability or output print quality of the machine.

Further advantages of the present invention will become apparent as the following description proceeds and the features characterizing the invention will be pointed out with particularity in the claims annexed to and forming a part of this specification.

SUMMARY OF THE INVENTION

An ionographic printing machine which has an ion projection device for generating electrostatic latent images, an electrostatic latent image development system which includes a toner supply means and a toner dispensing device for regulating the dispensing of toner into the toner supply means in accordance with a first set of dispensing parameters. Also included in the development system is a mechanism for transporting the toner particles from the developer sump to a position in close proximity to the electrostatic latent image, thereby developing the latent image with the toner particles. The printing machine further includes the ability to generate a controlled latent image area and to develop the controlled image area, while sensing the cumulative charge required for development of the area. Subsequently, a signal indicative of the cumulative developer charge is transmitted to a developer controller, which then compares the signal level to a nominal signal threshold level to determine whether the development system is operating at a nominal toner concentration. Should the toner concentration differ from the desired nominal concentration, the developer controller will calculate a second set of dispensing parameters, thereby causing the dispensing means to regulate the dispensing of toner in accordance with the second set of dispensing parameters.

BRIEF DESCRIPTION OF THE DRAWINGS

For a better understanding of the present invention reference may be had to the accompanying drawings wherein the same reference numerals have been applied to like parts and wherein.

DESCRIPTION OF THE PREFERRED EMBODIMENT

Figure 1:
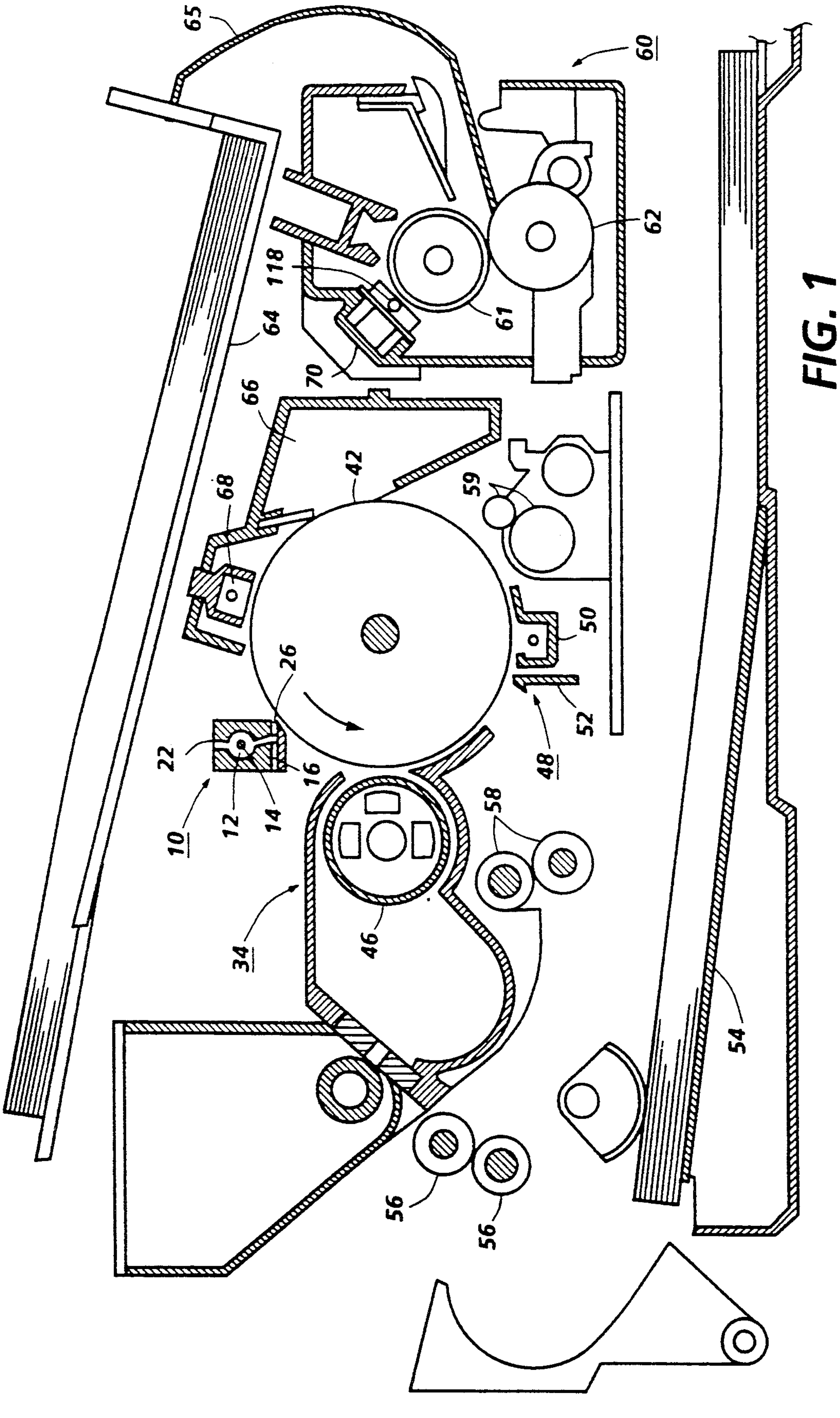
FIG. 1 is an elevational view depicting an electrographic printing machine incorporating the present invention.

With particular reference to the drawings, there is illustrated in FIG. 1, a printing apparatus in accordance with the present invention. Initially, the receiver 42, a substrate supporting any suitable electrostatic material is charged to a background voltage, in a preferred embodiment, approximately −1500 volts. The receiver 42 is rotated in a direction of the arrow past the outlet channel 26 of the fluid jet assisted ion projection apparatus, generally referred to by reference numeral 10.

Ion projection apparatus 10, includes an electrically conductive, elongated chamber 12 and a corona discharge wire 14, extending along the length of the chamber. A high potential source (not shown) on the order of several thousand volts dc, is connected to corona discharge wire 14 through a suitable load resistor, and a reference potential source (not shown) which may be ground, is connected to the wall of chamber 12. Upon application of the high potential to corona discharge wire 14, a corona discharge surrounds the wire, creating a source of ions of a given polarity (preferably positive), which are attracted to the grounded chamber wall and fill the chamber with a space charge.

Figure 3:
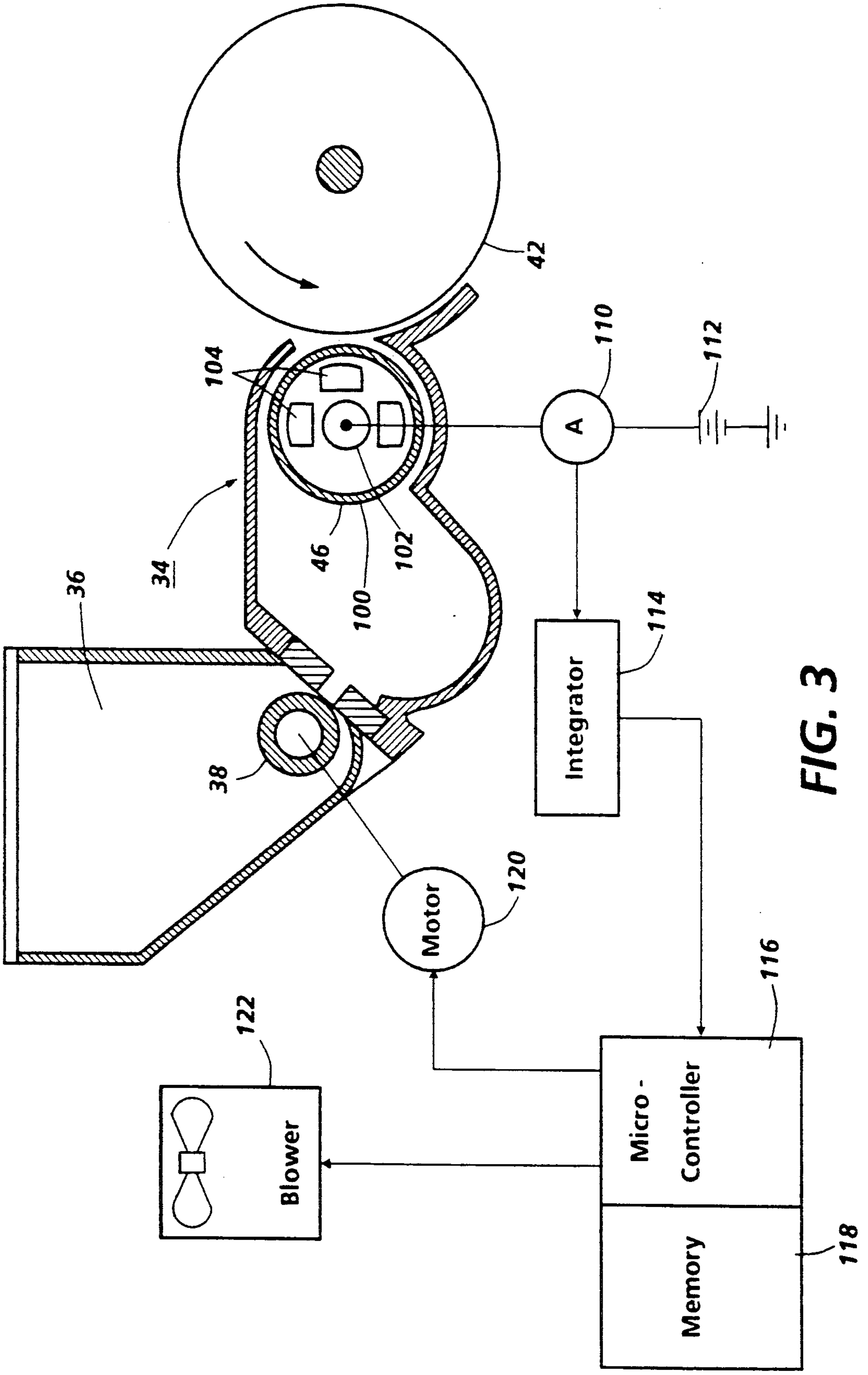
FIG. 3 is a schematic diagram illustrating the control scheme employed in the FIG. 1 printing machine.

An inlet channel 22 extends along the chamber substantially parallel to wire 14 to deliver pressurized transport fluid (preferably air) into the chamber 12 from a suitable source, such as blower 122 of FIG. 3. Outlet channel 26, from chamber 12, also extends substantially parallel to wire 14, at a location opposed to inlet channel 22, for conducting the ion laden transport fluid to the exterior of the apparatus 10. The outlet channel 26 comprises two portions, a first portion directed substantially radially outwardly from the chamber and a second portion angularly disposed to the first portion. The second portion is formed by the unsupported extension of a marking head spaced from and secured to the housing by an insulating shim 16. As the ion laden transport fluid passes through the outlet 26, it flows over an array of ion pixel or modulation electrodes (not shown), each extending in the direction of the fluid flow, and integrally formed on the marking head.

Ions are allowed to pass completely through and out of ion projection apparatus 10, through outlet channel 26 towards an insulating charge receiver 42 which collects the ions upon its surface in an image configuration. Once the ions have been swept into outlet channel 26 by the transport fluid, it becomes necessary to render the ion-laden fluid stream intelligible. This is accomplished by selectively controlling the potential on the modulation electrodes by any suitable means.

An imagewise pattern of information will be formed by selectively controlling each of the modulation electrodes in the ion projection apparatus so that the ion beams associated therewith either exit or are inhibited from exiting apparatus 10 in accordance with the pattern and intensity of light and dark spots of the image to be reproduced. It should be understood that the image to be reproduced is generally a digital image and that each light and dark spot is generally represented by a binary value.

The charge pattern corresponding to the image to be reproduced is projected onto the surface of the receiver 42 providing a latent image. Upon further rotation of the receiver to a developer station (generally shown at 34), a suitable developer roll 46 such as a magnetic development roll advances a developer material into contact with the electrostatic latent image. The latent image attracts toner particles from the carrier granules of the developer material to form a toner powder image upon the surface of the receiver.

The receiver 42 then advances to a transfer station shown generally at 48 where a copy sheet is moved into contact with the powder image. The transfer station 48 includes a transfer corotron 50 for spraying ions onto the backside of the copy sheet and also includes a pretransfer baffle generally shown at 52. Copy sheets are fed from selected trays, for example, tray 54 and conveyed through a suitable copy sheet paper path, driven by suitable rolls such as rolls 56 and 58 to the transfer station.

After transfer, the copy sheets are driven to fuser station 60 including fusing rolls for permanently affixing the transferred powder image to the copy sheets. Preferably, the fuser assembly includes a heated fuser roll 61 and backup or pressure roll 62 with the sheet passing therebetween. After fusing, the copy sheet is transported to a suitable output tray such as illustrated at 64. In addition, a suitable cleaner 66, for example, a blade cleaner in contact with the receiver surface removes residual particles from the surface. Finally, an erase scorotron 68 neutralizes the charge on the receiver and recharges the receiver to the background voltage.

Figure 2:
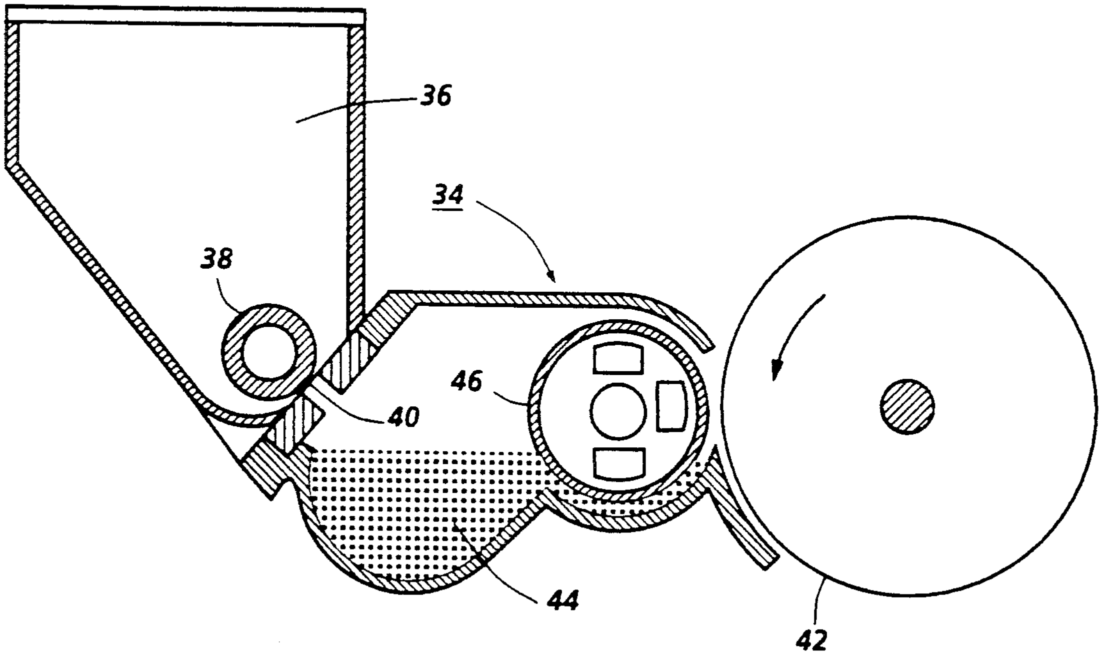
FIG. 2 is a detailed elevational view of the development housing of the electrographic printing machine of FIG. 1.

Referring now to FIG. 2, which depicts a detailed view of developer station 34, where the station is located in close proximity to receiver 42. Developer station 34, for example a removable cartridge type development system, includes a toner supply housing 36, where toner is stored until it is dispensed to the developer sump area 44 by a foam metering roll 38. Metering roll 38 completely covers elongated slot 40 which connects supply housing 36 and sump 44, thereby acting as a gate which permits only the toner trapped in the outer surface of the porous foam roll to pass into the developer sump. By rotating metering roll 38 under controlled conditions, the system is capable of dispensing toner to sump 44 in a regulated fashion.

However, due to variability in the porosity of the outer surface of the foam rolls used in the development stations, the machine to machine variability in dispense rates is considerable. This variability, as well as, the normal errors heretofore described by the Folkins et al. reference require the periodic determination of the actual toner concentration within developer sump 44 in order to correct the toner concentration as monitored using the Folkins et al. method.

Referring also to FIG. 3, which depicts the electrical components associated with the developer station of FIG. 2, developer roll 46 is a well known implementation of a magnetic developer roll, having a non-magnetic outer tube 100, rotatably mounted on an electrically conductive shaft 102. Disposed interiorly and spaced from tube 100 are a series of stationarily mounted elongated permanent magnets 104 which cause the formation of magnetic poles around the circumference of tube 100. Moreover, a current sensor, for example an ammeter as indicated generally by reference numeral 110, is coupled to shaft 102. Current sensor 110 is also coupled to a voltage source 112 which electrically biases shaft 102, and in turn the electrically coupled outer tube 100.

The output from current sensor 110 is directed to integrator 114 which integrates the signal from the current sensor over a predefined time interval. Integrator 114 further processes the current signal to provide microcontroller 116 with a signal indicative of the number of quantized units of current, hereinafter referred to as feedbacks (F), which have been detected by current sensor 110. Microcontroller 116 accumulates the feedback signals from integrator 114 in order to maintain a cumulative measure of the current ($\Sigma F$) required to maintain the developer roll charge bias.

Figure 4A:
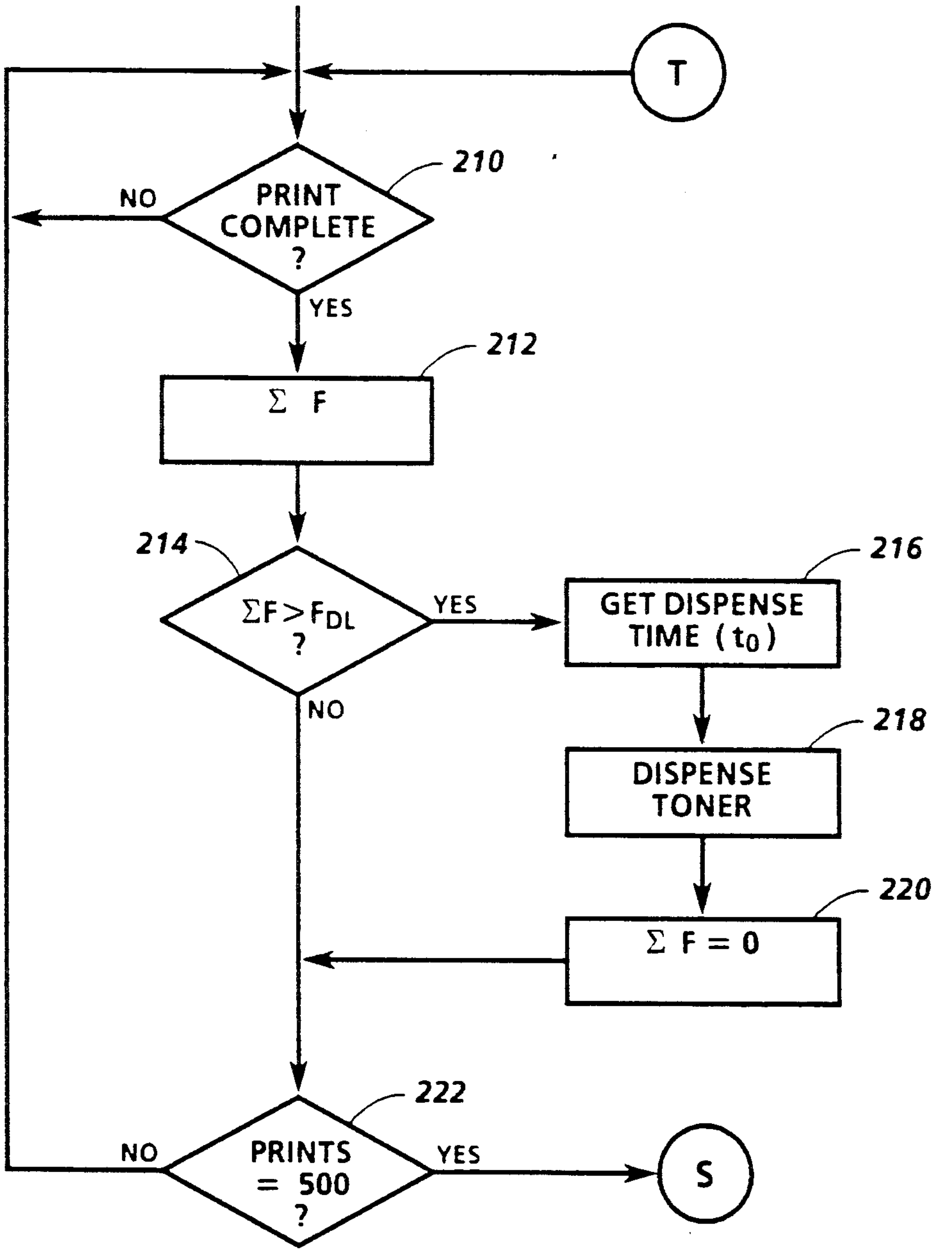
FIGS. 4A and 4B are flow diagrams illustrating the steps of the control scheme employed in accordance with the present invention.
Figure 4B:
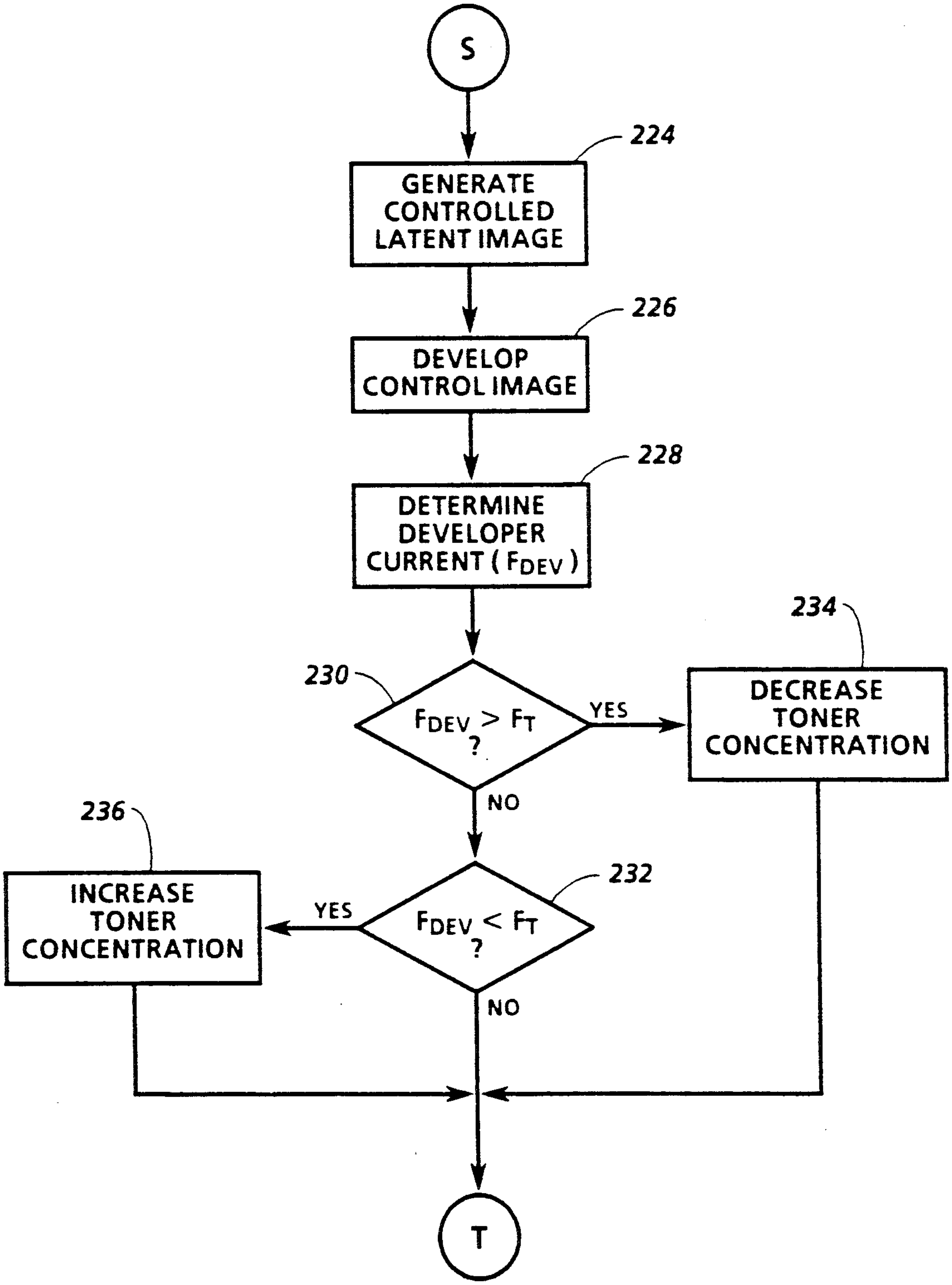

Referring also to FIGS. 4A and 4B, which depict the control scheme associated with the present invention during normal printing operation, block 210 detects the completion of a printed page. Subsequently, microcontroller 116 adds the most recent number of feedbacks (F) which have been detected by integrator 114, resulting in a cumulative total represented in block 212. Microcontroller 116 then tests to determine if the cumulative feedback value ($\Sigma F$) is greater than a dispense limit threshold value ($F_{DL}$). If not, the accumulated feedback value ($\Sigma F$) is retained for subsequent feedback value accumulation. If however, the feedback value is greater than the dispense threshold, as tested in block 214, the microcontroller will begin the process of dispensing toner by actuating motor 120, thereby causing metering roll 38 to rotate and transfer toner to the developer sump 44, of FIG. 2.

The toner dispense proces is regulated primarily by controlling the amount of time that metering roll 38 is allowed to rotate, referred to as the dispense time ($t_D$). Block 216 represents the step where the microcontroller retrieves the value of dispense time variable $t_D$, as stored in memory 118, to use in controlling the duration of operation of motor 120 during the dispense process of block 218. After replenishing the toner the cumulative feedback value is reset to zero in order to begin anew, the accumulation of feedbacks from integrator 114.

After testing if toner replenishment is required, the microcontroller tests to determine if it is the appropriate time to update the actual toner concentration within the developer sump, block 222. In the present embodiment, this test is executed by determining if a predefined number of prints have been produced, for example 500 prints. If the most recent print was the 500th print, the microcontroller will execute the toner concentration determination scheme beginning with block 224 of FIG. 4B.

Initially, the microcontroller places the system in a test mode and signals ion projection apparatus 10 of FIG. 1, to produce a controlled latent image area on image receiver 42. The latent image generated will have predefined dimensions, as well as, a predefined toner area coverage, meaning that a known quantity of toner would be required to develop the control image to the desired level. The predefined toner area coverage is achieved by controlling the amount of charge deposited in the image area while creating the latent image. This is possible because the amount of developer bias current used to develop the latent control image, or for that matter any image, is directly proportional to the total charge potential deposited on the receiver to form the image.

The ion flow during generation of the latent image is controlled by the modulation electrodes of ion projection apparatus 10, of FIG. 1. However, the actual amount of charge forced through the "open" modulation electrodes is controllable by regulating the flow of air through ion projection device 10 which carries the charged ions. In order to accurately control the charge deposited while generating the control image, microcontroller 116 is also used to regulate the speed of blower 122 which is directly coupled to inlet channel 22 of ion projection apparatus 10 in FIG. 1. By regulating the speed of blower 122, the flow of ions past the "open" modulation electrodes can be accurately regulated.

In order to determine the appropriate blower speed needed to obtain the desired flow of ions within the transport fluid, and in turn the desired latent image charge potential, the blower speed must also be calibrated. Generally, this type of calibration is executed whenever a new developer cartridge is installed, because the new cartridge contains a known toner concentration as determined by the factory premixed developer material. Therefore, by generating test patches and measuring the development current used to develop the patches with a known toner concentration, the blower speed can be adjusted until the development current is equal to the current normally needed to develop the test patch.

Figure 5:
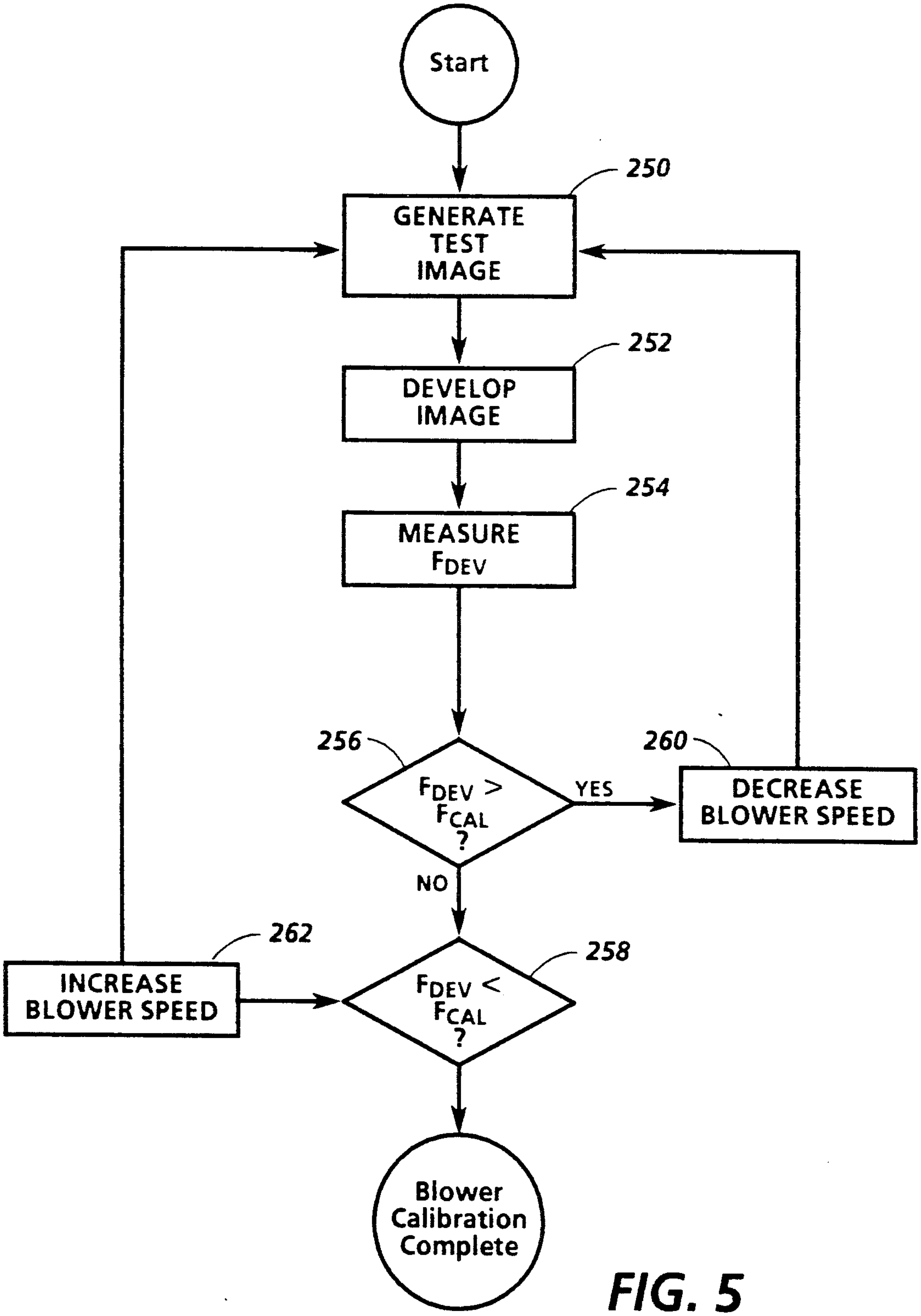
FIG. 5 is a flow diagram illustrating the steps of the blower speed calibration process, in accordance with the present invention.

More specifically, in the present embodiment, a factory new development cartridge is prepared with a toner concentration of 3.5%. When a new cartridge is installed in the printing system, a calibration test, the steps of which are illustrated in FIG. 5, is executed to determine the appropriate blower operation speed for the system. Referring briefly to FIG. 5, the blower test begins by generating a test image, step 250, using ion projection head 10 of FIG. 2. Subsequently, the latent test image is moved past development housing 34 of FIG. 1, in order to develop the latent test image, step 252. While developing the test image, the number of feedbacks, a relative measure indicative of the amount of development current needed to transfer the charged toner particles, is recorded to determine the total calibration development current quantized in feedbacks ($F_{DEV}$) at step 254. Subsequently, the calibration development current ($F_{DEV}$) is compared to the anticipated total current, also represented in units of feedbacks ($F_{CAL}$) in steps 256 and 258. The anticipated value $F_{CAL}$ is the value that would be expected for an image having the desired charge potential, and in turn the desired area coverage, when developed using developer with a predefined (3.5% in the present embodiment) toner concentration. If the development current $F_{DEV}$ is greater than the desired calibration current, indicated by $F_{CAL}$, then the blower is forcing too many ions out of ion projection apparatus 10, and the blower speed will have to be decreased, step 260, in proportion to the difference between $F_{DEV}$ and $F_{CAL}$. Similarly, if $F_{CAL}$ the blower speed will be increased proportionally at step 262. Subsequently, the calibration test will be rerun, starting at step 250, until the desired blower speed has been achieved.

Referring once again to FIGS. 2 and 4A, once the controlled latent image has been generated for the periodic toner concentration assessment, block 224, the image is developed at block 226. In a manner similar to the blower speed calibration process described above, the developer current required to develop the control image is monitored. The developer current is represented as the number of feedbacks occurring during development ($F_{DEV}$) in block 228. After determining the current required to develop the control image, microcontroller 116 compares $F_{DEV}$ against a threshold number of feedbacks $F_T$ to determine if $F_{DEV}$ is larger or smaller than the threshold value, blocks 230 and 232 respectively. The threshold number of feedbacks ($F_T$) is a predefined value, retrieved from memory 118, that is a function of the desired nominal toner concentration (3.5%) and the charge potential deposited on the control image.

Given that the predefined control image potential has been properly deposited during generation of the latent image, there is a direct relationship between the control image development current, represented by $F_{DEV}$, and the actual concentration of toner within the developer sump. If $F_{DEV}$ is greater than the 3.5% toner concentration threshold current ($F_T$) then the amount of toner used to develop the control image is higher than the desired amount, indicating that the concentration of toner in developer sump 44 is too high. Consequently, the rate of toner replenishment will be reduced in order to reduce the overall toner concentration within developer sump 44, represented by block 234. The reduction in toner concentration is accomplished by reducing dispense time $t_D$ and/or increasing the number of feedbacks which are required to trigger the toner dispense process, $F_{DL}$. Conversely, if the toner concentration were too low, as detected by block 232, the toner concentration would need to be increased. Similarly, to increase the toner concentration, block 236, dispense time $t_D$ is increased and/or $F_{DL}$ is decreased. The actual alteration of the dispense parameters is accomplished through the use of a lookup table which is stored in system memory 118, whereby microcontroller 116 locates the new values for $t_D$ and $F_{DL}$ and saves the new values for subsequent use. Alteration of the dispense parameters effectively changes the characteristics of the toner replenishment cycle. More specifically, the total cycle time is controlled by $F_{DL}$, while the active dispense portion of the cycle is $t_D$. After determining the actual toner concentration and new dispense parameters, the "Prints" variable is reset to zero in block 238 and control returns to normal printing control loop of FIG. 4A. The printing machine is then responsive to normal printing commands and the toner concentration will be regulated using the new dispense parameters.

Utilization of the new parameters will cause the toner concentration to move towards the target equilibrium concentration of 3.5%. In general, such a system will enable the correction of relatively large variations in toner concentration, thereby providing a more consistent printed output and at the same time controlling toner consumption.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. An ionographic printing apparatus for generating and developing a latent electrostatic image on an insulative surface with marking particles having means for storing a supply of marking particles, means for dispensing marking particles into the storing means, and means for transporting the marking particles from the storing means to a location closely adjacent the latent image for development thereof, wherein the improvement comprises:

means, operative during latent image development, for sensing the cumulative charge of the marking particles developed thereon, the sensing means further generating a signal pulse indicating when a predetermined amount of cumulative charge has been transferred with the marking particles;

means, responsive to a signal pulses, for regulating the discharge of marking particles into the storing means at a specified dispense rate upon detecting a predetermined number of pulses, thereby replenishing the supply of marking particles available within the transport means;

ion generating means for depositing ions on the insulative surface to create a latent image test patch having predefined characteristics;

means for selectively developing, with the marking particles, said latent image test patch;

means for measuring a cumulative charge of the marking particles developed on said latent image test patch;

means for transmitting a signal indicative of said cumulative charge to a control means for comparison with a threshold, based upon a nominal marking particle concentration, whereby the control means will determine an actual marking particle concentration within the storing means; and means for adjusting the specified dispensing rate in response to said actual marking particle concentration, so that the subsequent discharge of marking particles into the storing means, as regulated by the control means, is done in a manner suitable to cause an equilibrium concentration of marking particles to approach said nominal marking particle concentration.

2. The apparatus of claim 1 wherein the predefined latent image test patch characteristics comprise:

a predefined boundary; and a uniform, predefined charge potential within said predefined boundary.

3. The apparatus of claim 1 wherein the means for measuring the cumulative charge of the marking particles further comprises:

means, operative during the development of said latent image test patch, for sensing the current biasing the transporting means and producing a signal indicative thereof;

means for integrating said signal during development of said latent image test patch in order to produce a signal indicative of the cumulative charge transferred by the marking particles developed on said latent image test patch.

4. The apparatus of claim 1 wherein the means for adjusting the specified dispensing rate further comprises:

means for altering the duration of the dispense portion of a dispense cycle within which time the dispensing means actively transfers marking particles into the storing means; and means for adjusting the frequency of occurrence of said dispense cycle.

5. An ionographic printing apparatus having an ion projection device for generating electrostatic latent images on an electrostatic charge retentive surface, an electrostatic latent image development system including a toner supply means, toner dispensing means for dispensing toner into a developer sump in accordance with a set of dispensing parameters, and means for transporting the toner from the developer sump to a position in close proximity to the electrostatic latent image to cause the development of the latent image, including:

means, operative during latent image development, for sensing a total amount of charge transferred from the development system to the latent image by the transfer of charged toner, the sensing means further generating a signal pulse indicative of the transfer of a predetermined amount of charge therebetween;

means, responsive to the signal pulse, for regulating the dispensing of toner into the developer sump in accordance with the set of dispensing parameters, upon detecting a predetermined number of pulses, thereby replenishing a supply of toner available within the transport means;

means for generating a test latent image area with the ion projection device;

means for causing a development of said test latent image;

means for sensing a cumulative charge required to develop said test latent image and producing a signal indicative of said charge; and a developer controller, responsive to the signal produced by the cumulative charge sensing means, for analyzing the signal and comparing a level of the signal to a nominal signal threshold level to determine a concentration of toner with respect a nominal toner concentration, so that said developer controller may cause the dispensing means to subsequently regulate a dispensing of toner in accordance with a revised set of dispensing parameters.

6. The apparatus of claim 5 wherein the means for generating a test latent image area further comprises:

means for causing the generation of an electrostatic image having a predefined boundary; and means for uniformly depositing a predefined charge potential over a portion of the surface defined by said boundary.

7. The apparatus of claim 6 wherein the means for uniformly depositing a predefined quantity of charge potential over the surface further comprises:

means for regulating the flow of a transport fluid through the ion projection device so as to control the amount of charge used to generate said test latent image.

8. The apparatus of claim 5 wherein the means for sensing the cumulative charge further comprises:

means, operative during the development of said test latent image, for sensing the current required for biasing the transporting means and producing a signal indicative thereof;

means for integrating said signal during development of said test latent image in order to produce a signal indicative of the total charge transferred by the toner particles developed on said latent image test patch.

9. The apparatus of claim 5 wherein the developer controller further comprises:

means for modifying the dispense parameters, which further include;

means for altering the duration of the dispense portion of a dispense cycle within which time the dispensing means actively transfers toner particles into the developer sump, and means for adjusting the frequency of occurrence of said dispense cycle.

10. A method for calibrating a transport fluid supply means to achieve a desired flow of ions in an ionographic printer having an ion projection device for generating electrostatic latent images and said transport fluid supply means for controlling the flow of the transport fluid used to transport the ions to an electrostatic receiving means, the method including the steps of:

a) generating an ionographic latent test image on the electrostatic receiving means, said latent image having known dimensions and a uniform charge potential;

b) developing said latent test image with a developing apparatus containing a developer material with a known concentration of marking particles, while measuring a development current required to maintain said apparatus at a constant bias voltage;

c) comparing said development current with a desired calibration current, said desired calibration current representing, theoretically, the current required for the development of a latent image generated using a defined ion flow rate;

d) adjusting the transport fluid supply means in accordance with a difference between said development current and said calibration current; and e) repeating steps (a) through (d) until said development current is within an acceptable range of said calibration current.

11. A method of regulating a concentration of toner within a developer sump in an ionographic printing apparatus having an ion projection device for generating electrostatic latent images on an electrostatic receiving means, a transport fluid supply means for controlling a flow of the transport fluid used to transport the ions to an electrostatic receiving means, an electrostatic latent image development system including a toner supply means, toner dispensing means for dispensing toner into said developer sump in accordance with an active dispense time, and means for transporting the toner from the developer sump to a position in close proximity to the electrostatic latent image to cause a development of the latent image, the method including the steps of:

a) monitoring a quantity of charge transferred during the development of the electrostatic latent images;

b) comparing the quantity of charge to a dispense threshold;

c) operating the toner supply means in accordance with the active dispense time whenever the quantity of charge exceeds the threshold, thereby replenishing the toner depleted during image development and bringing the toner concentration within the sump closer to a nominal concentration;

d) periodically generating a latent ionographic test image on the electrostatic receiving means using the ion projection device, said test image having known dimensions and a uniform charge potential; and e) using the latent ionographic test image generated in step (d), approximating the actual concentration of toner within the sump in order to allow an adjustment of the dispense threshold and dispense time, so as to enable to the operation of step (c) achieve the nominal concentration.

12. The method of claim 11, wherein the step of periodically approximating the actual concentration of toner within the sump comprises the steps of:

a) developing the latent ionographic test image with the development system;

b) measuring the cumulative charge transferred with the toner transferred to the test image;

c) comparing the cumulative charge to a desired total charge, where the desired total charge is representative of the charge required to develop the test image with the nominal toner concentration, thereby determining if the actual toner concentration is above or below the nominal concentration; and d) adjusting the dispensing parameters to enable subsequent toner dispensing steps to bring the toner concentration to the nominal level.

13. The method of claim 12, wherein the step of adjusting the dispensing parameters includes the steps of:

increasing the active dispense time and decreasing the dispense threshold upon determining that the cumulative charge is less than the desired total charge; and decreasing the active dispense time and increasing the dispense threshold upon determining that the cumulative charge is greater than the desired total charge.

14. The apparatus of claim 1, wherein the ion generating means comprises:

means for regulating the rate at which ion transport fluid flows through the ion generating means, including means for calibrating the regulation means whenever the storing means contains a known concentration of marking particles, said calibration means being responsive to the development current required to develop a latent electrostatic image having a known size and uniform charge density with the known marking particle concentration, thereby enabling the adjustment of the ion transport fluid flow rate to achieve a desired ion flow rate.

* * * * *